Patented Mar. 31, 1936

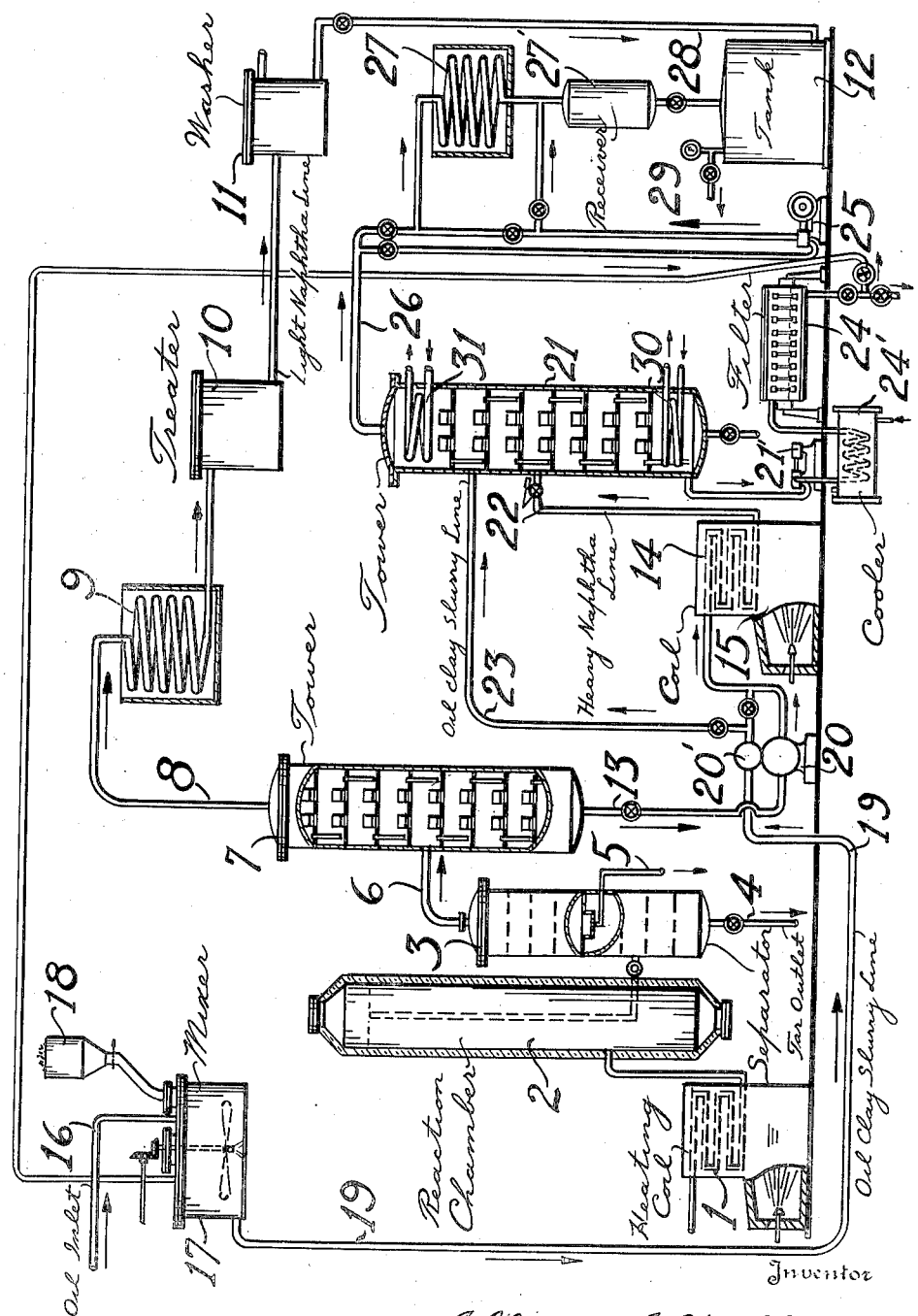

2,036,166

UNITED STATES PATENT OFFICE 2,036,166

PROCESS FOR TREATING NAPHTHA

Alfred A. Wells, Roselle Park, N. J., assignor to Standard Oil Development Company, a corporation of Delaware Application November 12, 1931, Serial No. 574,539

2 Claims. (Cl. 196—147)

This invention relates to a process for treating naphtha with clay and more specifically to a process for treating naphtha prepared by cracking. It will be understood from the following description when read in conjunction with the drawing, the sole figure of which is a diagrammatic side elevation partly in section of the apparatus used for carrying out the invention.

One aspect of the invention relates to the treating of naphtha by passing the same, together with a slurry of clay in heavier oil, through a narrow heated passageway in which most of the treating action takes place.

Another aspect relates to the passing of the naphtha and the slurry of clay in the heavier oil through the narrow heated passageway into a vaporizing zone in which the naphtha is vaporized and its vapors passed in counter-current with a slurry of clay in heavier oil introduced at the upper portion of the vaporizing zone.

Another aspect of the invention relates to the maintenance of a vacuum in the vaporizing zone to promote the vaporization at a low temperature of the treated naphtha from the heavier oil and the polymers formed.

Still another aspect of the invention relates to the separation of naphtha into a light and a heavy naphtha fraction, treating only the heavy naphtha fraction according to the several modifications of the invention just summarized, and combining the light and heavy naphtha.

Referring to the figure, numeral 1 designates the usual heating coil of a cracking unit, 2 the reaction chamber or soaking drum of the unit, 3 designates a separator with the tar draw-off line 4 and line 5 for drawing off gas oil and over-head vapor line 6 which latter leads into the fractionating tower 7. Both separator 3 and tower 7 may be of the usual bell cap plate construction.

The cracked naphtha leaving the separator through vapor line 6 is fractionated in tower 7 into a heavy naphtha and a light naphtha fraction which latter passes in vapor form through line 8 into a condenser 9 then through an alkali treater 10 and water washer 11 into a gasoline tank 12. The heavy naphtha fraction obtained as liquid in tower 7 is pumped through line 13 to the heating coil 14 arranged in furnace 15. A heavier oil such as straw oil or gas oil, is taken through line 16 from a tank (not shown) and mixed in the mixer 17 with clay admitted through hopper 18. The mixed oil clay slurry is then pumped through line 19 to the heating coil 14. Direct connected proportionating pumps 20 and 20' serve for passing the heavy naphtha and the oil clay slurry to the heating coil 14 in the desired proportion. The heated mixture from coil 14 is discharged into the vaporizing tower 21, which may be provided with bell capped contacting plates. If desired, a pressure difference may be maintained between the end of the heating coil and the tower 21 by means of pressure reducing valve 22. A by-pass line 23 serves to introduce part of the oil clay slurry to one of the top plates of tower 21. A filter 24 is connected to the bottom of tower 21 and a vacuum pump 25 is connected to the top of the tower through vapor line 26. The vacuum pump is followed by condenser 27 and the treated naphtha line 28 which discharges into the gasoline tank 12. A vent 29 serves to remove gaseous products discharged into tank 12 with the light naphtha fraction. A closed steam coil 30 may be provided at the bottom of tower 21 and a cooling coil 31 at the top.

The naphtha is separated in fractionating tower 7 into a light and a heavy naphtha, in such a way that the light naphtha has, when condensed, a distillation end point of between 250–350° F. depending on the character of the stock under treatment. The light naphtha may not need any further treatment or may just need an alkali treatment and water wash in order to remove sulfur compounds.

The heavy naphtha, which contains gum forming and color imparting constituents, is treated for the removal of such constituents according to the present invention by passage through a heating coil in conjunction with a slurry of clay in a heavier oil. I discovered that the clay has an especially beneficial treating action upon the naphtha when a heavier oil such as gas oil, straw oil, light lubricating oil, etc., is present, together with clay during the passage of the naphtha through the heating coil of the treater. The proportions of the heavier oil and treating clay per unit weight of naphtha may be for example 5–20% of which 1–4% is clay. The clay may be any of the decolorizing clays known in the art, such as fuller's earth, acid treated clay, etc.

The temperature to which the mixture passing through the coil 14 is heated may vary within appreciable limits, say from 350° to 600° F. or higher. A high pressure of several hundred pounds may be maintained upon the heating coil 14 by means of the pressure release valve 22 although in many cases a considerably lower pressure such as about one atmosphere at the end of the coil will also give satisfactory results. Usually the higher the temperature of the cracking the higher will be the pressure to be maintained on heating coil 14 in order to obtain good treating results. The pressure, however, is also influenced to some extent by the amount of the heavier oil admixed at pump 20'.

The vacuum under which tower 21 is held is usually of the order of 5-10 inches of Hg absolute pressure and should be sufficient to completely vaporize the naphtha and separate it from the heavier oil from which the spent clay is then removed in the filter. If the contained heat of the mixture at the end of the heating coil and the vacuum on tower 21 are not sufficient for a complete vaporization of the naphtha, additional heat may be supplied by means such as the closed steam coil 30 at the bottom of tower 21.

The treated heavy naphtha and the alkali treated and water washed light naphtha are united to give a finished gasoline.

The main treating action takes place during the passage of the heavy naphtha and clay in the presence of the heavier oil through heated coil 14. The heavier oil promotes the action of the clay upon the heavy naphtha. We do not exactly know the reason of this influence of the heavy oil upon the treating action but tentatively attribute it to the circumstance that the heavier oil has the tendency of keeping substantially the total heavy naphtha in the liquid phase during its passage through coil 14 and thus assures a thorough contact of the naphtha and clay.

Another beneficial action of the heavier oil appears in the tower 21 in which the heavier oil keeps the clay in a slurry and facilitates the easy removal of the clay from the vaporizing tower. Of course, the heavy oil gradually becomes contaminated since it takes up all the polymerized products formed during the treatment so that after using it several times it is necessary to discard it from the process.

As mentioned above the main treating action takes place during the passage of naphtha and the slurry of clay and heavier oil through the heated coil 14. However, the naphtha vapors, separated in vaporizing tower 21, undergo an additional treatment in the same tower while these vapors pass in counter-current to the slurry of clay in heavier oil admitted through by-pass line 23. This modification of my process, therefore, affords a double treatment of the heavy naphtha fraction with clay, one mainly in liquid phase and the other one in vapor phase.

The following example will serve to illustrate my process:

A low sulfur gas oil such as Mid-Continent gas oil is cracked at a suitable temperature, say 865° F., in the cracking equipment. The cracked distillate is separated in tower 3 into tar, which is withdrawn from the unit, gas oil which is recycled and a naphtha distillate having an end point of approximately 450° F., which passes to tower 7. The naphtha is separated in 7 into a light naphtha having an end point of approximately 300° F., which is soda washed and water washed before going to tank 12.

A mixture of gas oil and clay is made in tank 17, using approximately one pound of clay per gallon of oil.

The heavy naphtha from the bottom of tower 7 is pumped through the coil 14 together with the oil-clay mixture from 17 in such proportions that there will be approximately 4 lbs. of clay to each barrel of heavy naphtha. Another quantity of the oil-clay mixture equivalent to about 1 pound of clay per barrel of heavy naphtha is pumped through line 23 to the second plate of tower 21. The heavy naphtha-oil-clay mixture is heated to 500-550° in passing through the coil 14, the valve 22 being so adjusted that enough pressure is maintained in the coil to prevent the gas oil and a large portion of the naphtha from vaporizing, and passes into the fractionating column 21. In the column vaporization occurs, the vapors pass upwards and are further treated by the oil-clay mixture reflux. By means of the heating coil 30 and the cooling coil 31 the temperature within the tower is so controlled as to have a temperature of approximately 350° F. at the top of the tower and 450° at the bottom when holding an absolute pressure of 5 inches of Hg and running for a gasoline end point of approximately 400° F. The oil-clay mixture is removed from the bottom of the tower and after cooling the clay is filtered out and the oil returned to storage for re-use in making the oil-clay slurry. The treated heavy naphtha passes to a receiving drum where the vacuum is released and thence to tank 12 where it is blended with the soda washed light naphtha. If desired, the blended naphtha can be further treated with litharge solution to sweeten it.

The gasoline produced by the above treatment will be water white in color, of good stability as to color and gum and will be free from gummy constituents. The boiling range will be within the specifications for U. S. motor gasoline.

My invention is not to be limited by any theory nor by the specific details given by way of illustration but only by the appended claims in which it is my intention to claim all novelty inherent in the process.

I claim:

1. The process of treating cracked naphtha to remove undesirable unsaturated constituents therefrom which comprises passing the naphtha in admixture with a slurry of finely divided solid adsorbent catalytic material in gas oil through a heated passageway of restricted cross-sectional area under superatmospheric pressure, discharging the products to a vaporizing zone and fractionating them to separate a slurry of finely divided solid adsorbent material in gas oil and while retaining substantially all the treated naphtha in the vapor form, condensing the naphtha vapors to form a desired final product, separating the gas oil from the solid adsorbent material and recycling said gas oil for admixture with the naphtha passed through said passageway.

2. The process according to claim 1 in which the vapors of naphtha rising in the vaporizing zone pass in counter-current to an additional portion of the first-mentioned slurry of finely divided adsorbent material and gas oil.

ALFRED A. WELLS.